Aug. 7, 1962 H. A. SNOW ETAL 3,048,796

BROADBAND DIODE FM MODULATOR

Filed May 21, 1959

INVENTORS.
HAROLD A. SNOW
HANS W. KETTMANN
BY Charles Baraff
AGENT

United States Patent Office 3,048,796

Patented Aug. 7, 1962

3,048,796

BROADBAND DIODE FM MODULATOR

Harold A. Snow, West Orange, and Hans W. Kettmann, Cedar Grove, N.J., assignors to International Telephone and Telegraph Corporation, Nutley, N.J., a corporation of Maryland Filed May 21, 1959, Ser. No. 814,865
6 Claims. (Cl. 332—19)

This invention relates to modulators and more particularly to frequency modulating (FM) modulators.

FM modulators are known which are broadband in regard to both deviation and video modulating frequencies, such as klystron modulators and phase shift modulators used in radio relay and over-the-horizon radio links. Conventional modulators for line-of-sight radio systems which utilize AFC for the oscillator have the disadvantage that as the oscillator frequency drifts off center, the AFC voltage changes the modulator bias, moving it from the best operating point in order to correct the center frequency. As a result the AFC action increases the distortion of the modulator and restricts the range of frequency drift over which the AFC can control without deteriorating system performance.

Accordingly, an object of the invention is a broadband FM modulator of low distortion.

Another object of the invention is a broadband FM modulator of low distortion with fine control of the center frequency of the oscillator and the FM swing by the modulator.

A feature of the invention is a broadband FM modulator of low distortion wherein the oscillator is modulated by variable diode reactances which provide a suitable S-shape modulation characteristic.

Another feature of the invention is the use of dual diode modulators, one for controlling the video frequency modulation of the oscillator and the other for the AFC circuit of the oscillator wherein the reaction between the two modulators is small for variations in center frequency of the order of plus or minus one megacycle so that the performance does not deteriorate for normal frequency drifts.

The above-mentioned and other features and objects of this invention will become more apparent by reference to the following description taken in conjunction with the accompanying drawings, in which.

Figure 1:
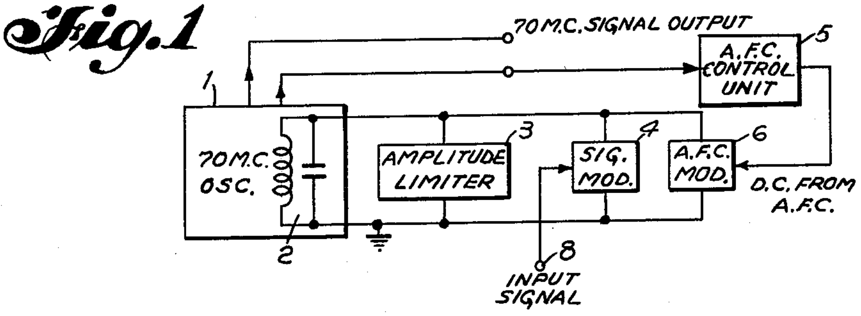
FIG. 1 is a block diagram of the broadband diode modulator in accordance with the invention.

Referring to FIG. 1, an oscillator 1 for example, providing 70 megacycle oscillations is provided with a tuned tank circuit 2 and an amplitude limiter 3 is coupled to said oscillator for maintaining a constant level of oscillations. A modulating signal from an input terminal 8 is applied to a modulator network 4 connected to the tank circuit 2 whereby the frequency of oscillator 1 is modulated by the reactance of network 4.

The frequency of oscillator 1 is maintained at a desired center point by an AFC circuit 5 from which a D.C. voltage is derived for controlling a second modulating circuit 6 designated the AFC modulator.

Figure 2:
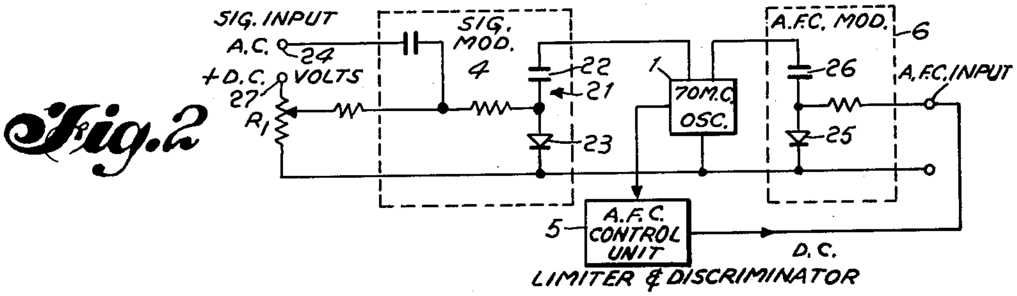
FIG. 2 is a block diagram similar to FIG. 1 showing the signal modulator and AFC modulator.

Referring to the more detailed schematic of FIG. 2, which is similar to the FIG. 1 schematic, the signal modulator 4 is a diode reactance network 21 comprising the series combination of capacitor 22 and semi-conductor diode 23 connected to an A.C. signal source 24, which may be audio or video, for frequency modulating the oscillator 1. The diode reactance modulator 4 operates on the principle that the reactance of the capacitor diode network can be varied by changing the diode bias and it has been found that the linearity of frequency deviation is thereby improved over reactance tube modulators. A D.C. bias from terminal 27 via potentiometer $R_1$ sets the operating point of diode 23 as explained hereinafter. The second modulator network 6, designated the AFC modulator, maintains the center frequency of the oscillator and restricts the range of frequency drift. The reaction between the two modulators 4 and 6 is small for variations in center frequency of the order of $\pm 1$ megacycle, so that the system performance does not deteriorate for normal frequency drifts. The AFC control circuit is a conventional unit which contains a limiter and discriminator (not shown) and produces a D.C. output voltage which varies in magnitude in accordance with the average variations of the oscillator from its center frequency.

The diode modulator has an S-shaped modulator characteristic (input voltage vs. output frequency) which is sufficiently symmetrical to provide reasonably linear operation with large frequency deviations near the central region.

Figure 3:
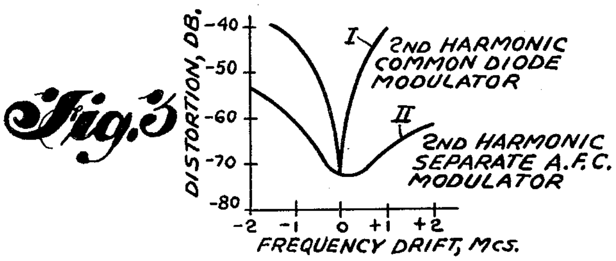
FIG. 3 is a graph of curves comparing distortion due to AFC action for single and dual FM modulators.

Referring to FIG. 3, the curves I and II illustrate the relative improvement with respect to distortion, resulting from the dual diode modulators 4 and 6 for signal and AFC respectively. The curves I and II plot distortion in db. vs. frequency drift in mc.

In conventional reactance tube modulators, a D.C. voltage from the AFC control circuit is usually combined with the video signal and operates on a single modulator for stabilizing the center frequency. This has the disadvantage that as the frequency drifts off center, the AFC voltage changes the modulator bias moving it from the best operating point, in order to correct the center frequency. In such modulators, the AFC action contributes to an increase in the distortion created by the modulators and restricts the range of frequency drift over which the AFC can provide effective control of the oscillator without deteriorating system performance.

Figure 4:
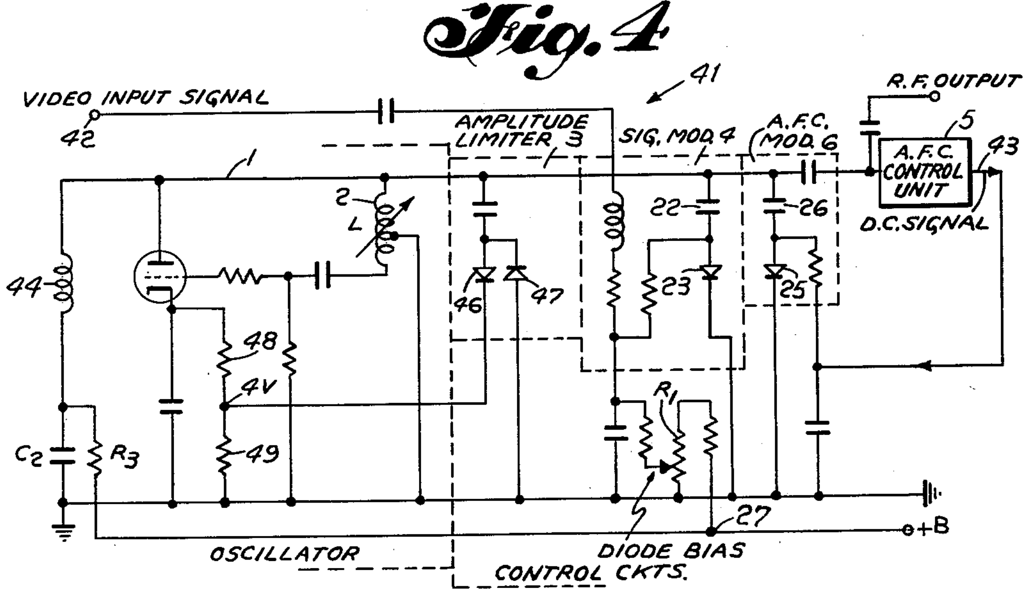
FIG. 4 is a simplified circuit schematic of the FM diode modulator in accordance with the invention.

The dual modulators 4 and 6, FIG. 4, one for the video signal and the second for AFC, separate the two functions aforementioned effectively, and thereby decrease the distortion.

Curve I shows the variations in distortion of the signal modulator when the AFC operates into a common modulator of a conventional modulator circuit with a single modulator. Curve I shows a distortion poorer than 50 db for frequency drifts of $\pm 0.5$ mc. or more.

Curve II shows the distortion of the present dual signal modulator, where a separate AFC modulator network is used for AFC. The distortion remains better than $-50$ db for a $\pm 2$ mc. drift. The frequency drift scale for curves I and II is the amount that the oscillator frequency is detuned without AFC from the normal 70 mc. The AFC action returns the frequency to approximately 70 mc.

Referring to the detailed circuit schematic of FIG. 4, the FM modulator 41 operates at 70 mc. and is capable of a maximum operating deviation of $\pm 1$ mc. when modulated by PTM or PCM pulse signals. The modulator 41 includes a 70 mc. oscillator 1 connected to an AFC circuit 5, and modulated by reactance diode networks 4 and 6.

The 70 mc. oscillator 1 has an LC tank circuit 2, the frequency thereof being controlled by the two diode modulators 4 and 6. The tuned tank circuit 2 consists of a tapped, tunable inductor L, shunted by the two capacitances 22, 26 of the diode networks 4 and 6, respectively and other tube and stray capacitances.

The plate supply of oscillator 1 is shunt fed through choke 44 and a decoupling network $R_3$, and $C_2$.

Limiting of the oscillator level is accomplished by two silicon diodes 46, 47; the level of the limiting being set by the D.C. voltage at the junction of cathode resistors 48, 49. This is a conventional limiter employing two semiconductor diodes shunted across the signal circuit. Each diode is biased beyond cut-off. When signal peaks exceed the bias voltage the diode impedances drop to a low value, limiting the peak signal amplitude.

The signal modulator 4 consists of the series combination of a silicon diode 23 and a capacitor 22 connected across the tank circuit inductor L. The impedance of this series combination, which has a capacitive reactance component, is a function of diode current. A poteniometer $R_1$ (FIG. 2) which is the modulator linearity control, sets the operating value of diode current, so that the relation between input video voltage at terminal 42 and the resultant frequency deviation is linear.

The AFC modulator network 6 is similar to the signal modulator 4, and consists of capacitor 26 and silicon diode 25, whose reactance is a function of diode current. If the diode current is zero, the effective capacitance is at a minimum and the oscillator frequency is high. Conversely, when the diode current is at its highest value, the effective capacitance is at a maximum and the oscillator frequency is low. The swing caused by the AFC modulator 6 is about $\pm 2$ mc.

The D.C. signal appearing at terminal 43 from the AFC control circuit 5 is the output of the AFC discriminator (not shown) to which an adjustable value of D.C. voltage has been added. The AFC (automatic frequency control) control circuit 5 is a conventional circuit utilizing a limiter and discriminator, whereby the average output frequency of the oscillator is converted into a D.C. voltage, which is fed back to a frequency controlling element (AFC modulator 6) of the oscillator in a negative sense, to oppose frequency changes.

Various other equivalent systems of that described may be evident to those skilled in the art to which this invention pertains, and so the invention is not to be construed as limited necessarily to the preferred embodiment.

While we have described above the principles of our invention in connection with specific apparatus, it is to be clearly understood that this description is made only by way of example and not as a limitation to the scope of our invention as set forth in the objects thereof and in the accompanying claims.

We claim:

1. A frequency modulation system comprising an oscillator having a resonance circuit, a source of signals, a first frequency modulating diode responsive to said signals for varying the frequency of said oscillator in accordance with said signals, means coupled to said oscillator for producing a control voltage responsive to deviations of the mean frequency of said oscillator from a given center frequency, a second frequency modulating diode responsive to said control voltage for maintaining the center frequency of said oscillator substantially fixed, and means for independently coupling each of said diode modulators in parallel across said resonance circuit with the respective diodes poled alike.

2. A frequency modulation system comprising an oscillator having a frequency determining circuit, a source of signals, means coupled to said oscillator for producing a control voltage responsive to deviations of the mean frequency of said oscillator from a given center frequency, a first frequency modulating modulator, a second frequency modulating modulator independent of said first modulator, means for applying the signals from said source to said first modulator, means for applying said control voltage to said second modulator, means for applying the output signal of said first modulator in parallel across said frequency determining circuit and means for applying the output signal of said second modulator independently of the output signal of said first modulator in parallel across said frequency determining circuit.

3. The frequency modulation system of claim 2, wherein each of said modulators comprises a reactance diode in series with a capacitor.

4. The frequency modulation system of claim 2, wherein an amplitude limiter comprising two diodes poled oppositely is coupled between said oscillator and said independent modulators.

5. The modulating system of claim 2, and an amplitude limiter connected to said oscillator for maintaining a constant level of oscillation.

6. The modulation system of claim 1, wherein the diode modulators have an S-shaped modulation characteristic and their capacitive reactance is variable with diode bias.

References Cited in the file of this patent

UNITED STATES PATENTS

| | | |
|---|---|---|
| 2,473,790 | Crosby | June 21, 1949 |
| 2,708,739 | Bucher | May 17, 1955 |
| 2,709,786 | Warriner | May 31, 1955 |
| 2,811,642 | Gabor | Oct. 29, 1957 |
| 2,825,810 | Zeidler | Mar. 4, 1958 |